(12) United States Patent
Jang et al.

(10) Patent No.: US 8,035,515 B2
(45) Date of Patent: Oct. 11, 2011

(54) SECURITY SYSTEM USING LASER RANGE FINDER AND METHOD OF DETECTING INTRUDER USING LASER RANGE FINDER

(75) Inventors: Jae-Hyung Jang, Gwangju (KR); Hyuk Lim, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 407 days.

(21) Appl. No.: 12/244,766

(22) Filed: Oct. 2, 2008

(65) Prior Publication Data

US 2009/0091446 A1  Apr. 9, 2009

(30) Foreign Application Priority Data

Oct. 4, 2007 (KR) ........................ 10-2007-0099623

(51) Int. Cl.
*G08B 13/18* (2006.01)
(52) U.S. Cl. ........ 340/557; 340/552; 340/522; 340/511; 340/567; 348/152; 356/4.01; 356/4.07; 356/5.01; 356/6
(58) Field of Classification Search .................. 340/557, 340/556, 552, 522, 511, 567; 348/152; 356/5.01, 356/4.01, 4.07, 6
See application file for complete search history.

(56) References Cited

U.S. PATENT DOCUMENTS

| 6,188,318 | B1 * | 2/2001 | Katz et al. ................. 340/545.3 |
| 6,188,319 | B1 * | 2/2001 | Frucht .......................... 340/557 |
| 7,164,116 | B2 * | 1/2007 | Akagi ........................... 250/221 |
| 2002/0185618 | A1 * | 12/2002 | Ohishi et al. ............. 250/559.38 |
| 2004/0051860 | A1 * | 3/2004 | Honda et al. ................ 356/4.01 |
| 2005/0168721 | A1 * | 8/2005 | Huang .......................... 356/5.08 |

FOREIGN PATENT DOCUMENTS

| JP | H9-318743 A | 12/1997 |
| JP | H11-038138 A | 2/1999 |
| JP | 2007-114002 | 5/2007 |

\* cited by examiner

*Primary Examiner* — Tai T Nguyen

(57) ABSTRACT

A security system using a laser range finder that can precisely determine an existence and a location of an intruder, and a method of detecting the intruder using the laser range finder are provided. The security system using a laser range finder, the security system includes: the laser range finder emitting laser beam, receiving the reflected laser beam, measuring a distance between the laser range finder and a target object, and detecting an existence and a location of an intruder; and at least one reflective means reflecting the emitted laser beam toward the laser beam finder, wherein at least one reflective means is spaced by a predetermined distance of the laser range finder and is installed a predetermined distance from the laser range finder.

13 Claims, 3 Drawing Sheets

[FIG. 1]
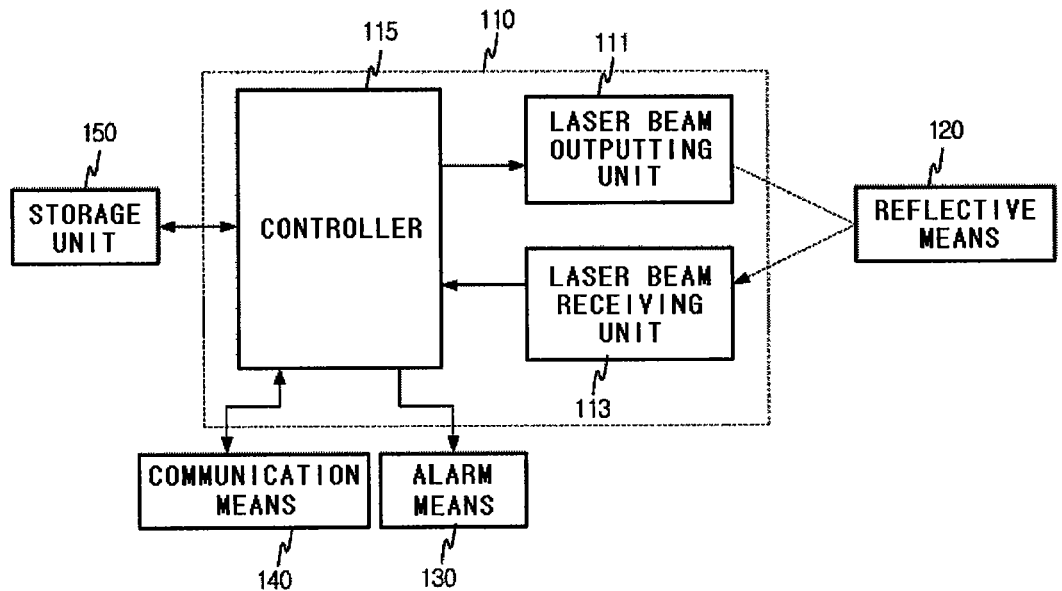
[FIG. 2]
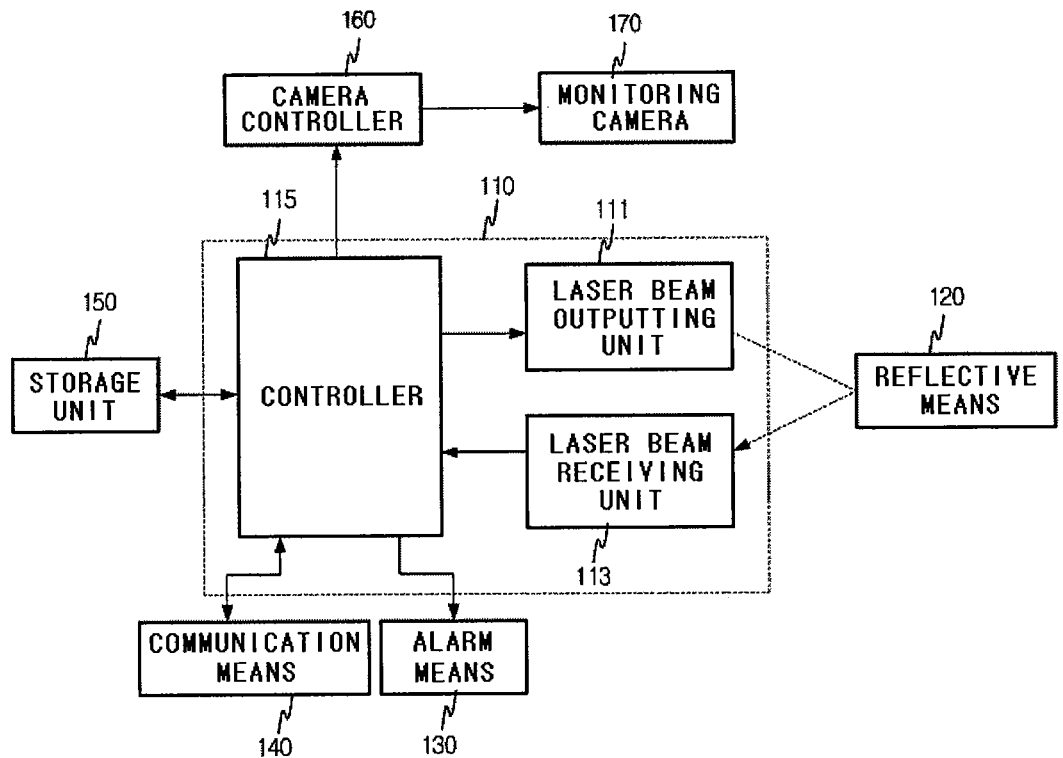

[FIG. 3]
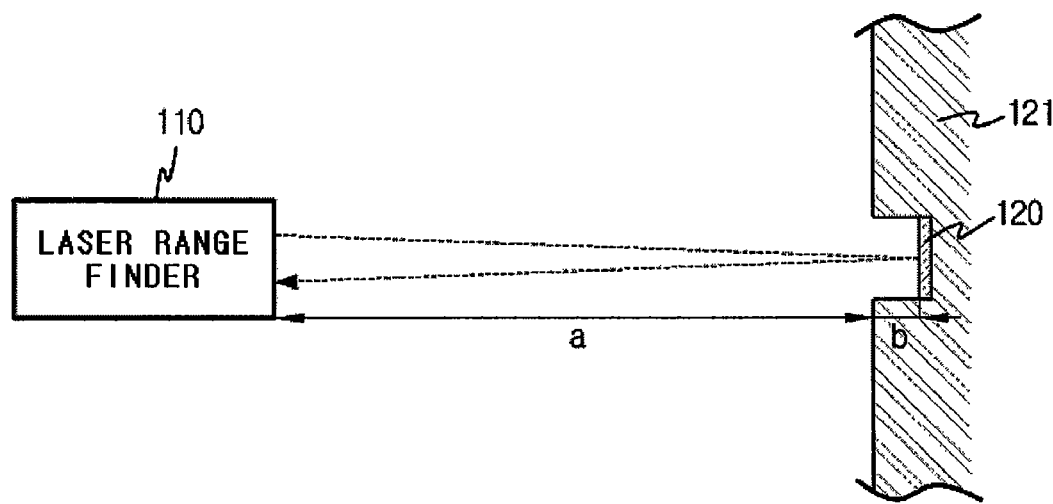
[FIG. 4]
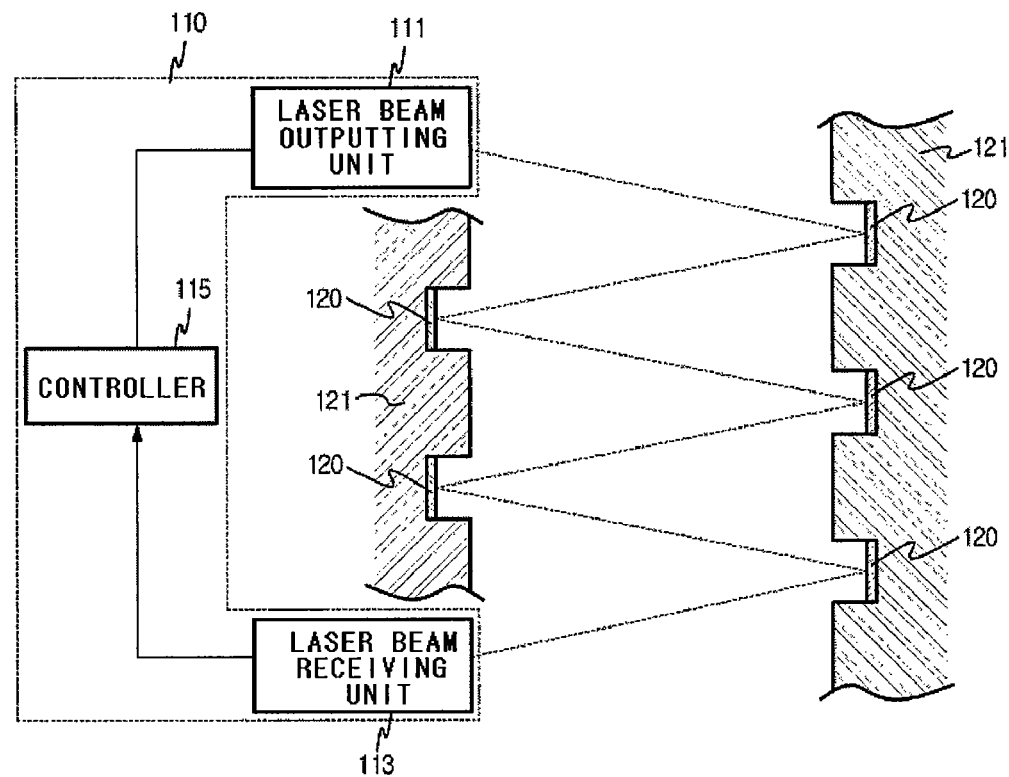

[FIG. 5]
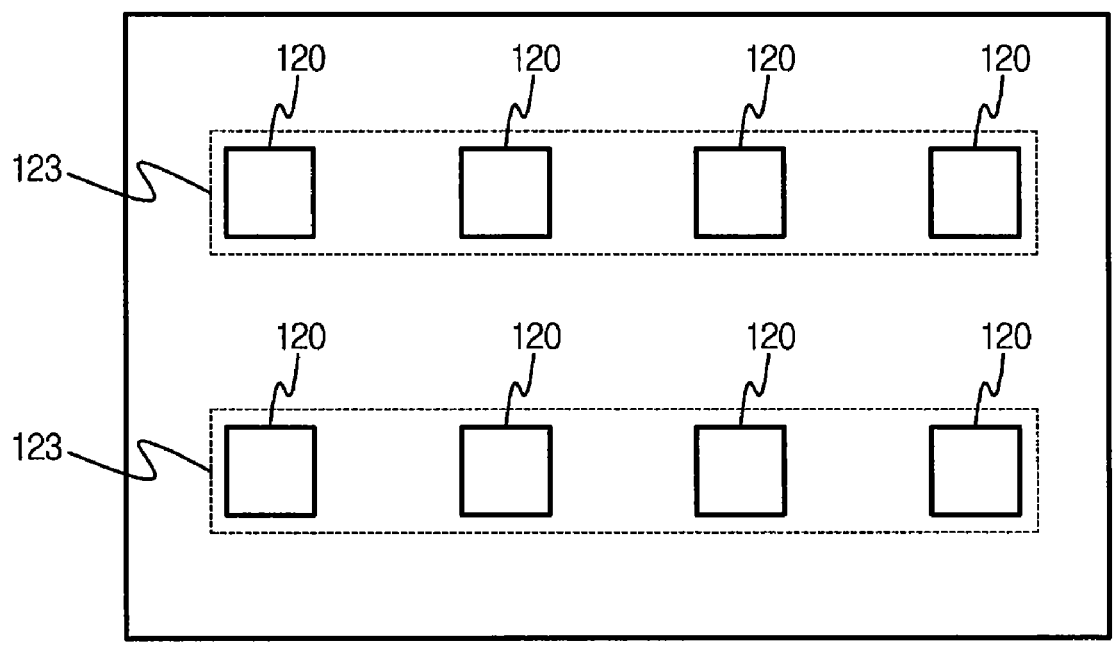

SECURITY SYSTEM USING LASER RANGE FINDER AND METHOD OF DETECTING INTRUDER USING LASER RANGE FINDER

BACKGROUND OF THE INVENTION

1. Technical Field

The present invention relates to a security system, and more particularly to, a security system using a laser range finder for precisely determining an existence and a location of an intruder and a method of detecting the intruder using the laser range finder.

2. Related Art

In general, the development of an electronic communication technology has recently resulted in an increase in a place where an unattended security system is installed. The unattended security system is mainly installed indoors, emits ultrasonic wave or infrared rays to a predetermined space, when an abnormality in the amount of reflective ultrasonic wave or infrared rays is detected, determines that an intruder has broken in, sets off an alarm, and notifies a security company or a predetermined place of such intrusion over a communication network.

However, the unattended security system that emits ultrasonic wave or infrared rays cannot determine a location of the intruder but can only determine an existence of the intruder. As a result, not only can the unattended security system not efficiently monitor the intruder using a monitoring system such as a closed circuit television (CCTV), but the installation cost is increased, and is limited to indoors.

Korean Patent No. 2006-11676 discloses a burglar proof system that uses a laser beam to monitor an intruder in a relatively wide monitoring area such as a ginseng field, a rice field, a field, or an outdoor grain storage, and notifies a manager of the intrusion status when an intruder breaks in, and sets off an alarm means in order to alert the intrusion of an intruder.

SUMMARY OF THE INVENTION

In Korean Patent No. 2006-11676, the burglar proof system determines an existence of an intruder according to whether laser beam emitted by a laser emitter is received or not; however, the burglar proof system cannot determine a location of the intruder but can only determine the existence of the intruder, when using the conventional security system that emits ultrasonic wave or infrared rays. Further, because the burglar proof system can only determine the existence of the intruder but cannot determine the location of the intruder, the burglar proof system cannot perform a monitoring function that is synchronized with a monitoring system including a monitoring camera such as a closed circuit television (CCTV), which deteriorates the monitoring function.

Accordingly, it is an object of the invention to provide a security system using a laser range finder that can precisely determine an existence and a location of an intruder.

It is another object of the invention to provide a method of detecting an intruder using a laser range finder that can precisely determine an existence and a location of the intruder.

According to an aspect of the present invention, there is provided a security system using a laser range finder, the security system comprising: the laser range finder emitting laser beam, receiving the reflected laser beam, measuring a distance between the laser range finder and a target object, and detecting an existence and a location of an intruder; and at least one reflective means reflecting the emitted laser beam toward the laser beam finder, wherein at least one reflective means is spaced by an error distance of the laser range finder and is installed a predetermined distance from the laser range finder. The laser range finder may comprise: a laser beam outputting unit emitting the laser beam toward at least one reflective means; a laser beam receiving unit receiving the laser beam reflected by at least one reflective means and converting the received laser beam into an electrical signal; and a controller measuring the distance between the laser range finder and the target object based on the electrical signal provided by the laser beam receiving unit, comparing the measured distance with a previously established distance, if the measured distance is different from the previously established distance, determining that the intruder exists, and measuring the location of the intruder based on the measured distance. The controller may generate intrusion information and an alarm control signal when the controller determines that the intruder exists. The security system may further comprise: a communication means comprising at least one of wired and wireless network interfaces, and transmitting the intrusion information under the control of the controller; and an alarm means performing at least one of an alarm sound output operation and an emergency light operation under the control of the controller. The security system may further comprise: a monitoring camera photographing an image of the intruder; and a camera controller controlling the monitoring camera based on the location of the intruder provided by the controller, photographing the image of the intruder, and providing the controller with the photographed image of the intruder. The camera controller may control at least one of up/down/left/right angles, an image angle, and a magnification of the monitoring camera based on the location of the intruder provided by the controller. At least one reflective means may be installed in the form of a grid in locations that face each other, and reflect the laser beam emitted by the laser range finder toward the reflective means installed in locations that face each other. At least one reflective means may be installed in the form of at least one row having different heights, and at least one row comprise at least one reflective means that are installed to have the same height.

According to another aspect of the present invention, there is provided a method of detecting an intruder using a laser range finder, the method comprising: emitting a laser beam from the laser beam finder; reflecting the laser beam emitted by the laser range finder toward the laser range finder through at least one reflective means that is spaced within a predetermined error distance of the laser range finder and is installed a predetermined distance from the laser range finder; and detecting an existence and a location of an intruder by receiving the laser beam reflected by at least one reflective means, measuring a distance between the laser range finder and a target object. The receiving of the laser beam reflected by at least one reflective means may comprise: generating intrusion information and an alarm control signal when it is determined that the intruder exists. The receiving of the laser beam reflected by at least one reflective means may comprise: transmitting intrusion information through at least one of wired and wireless network interfaces when it is determined that the intruder exists. The method may further comprise: when it is determined that the intruder exists, controlling a monitoring camera based on the location of the intruder; and photographing an image of the intruder by using the monitoring camera.

BRIEF DESCRIPTION OF THE DRAWINGS

FIG. 1 is a block diagram of a security system using a laser range finder according to an embodiment of the present invention;

FIG. 2 is a block diagram of a security system using a laser range finder according to another embodiment of the present invention;

FIG. 3 is a view of an installation location of a reflective means shown in FIGS. 1 and 2 according to an embodiment of the present invention;

FIG. 4 is a view of an installation location of a reflective means shown in FIGS. 1 and 2 according to another embodiment of the present invention; and FIG. 5 is a view of an installation location of a reflective means shown in FIGS. 1 and 2 according to another embodiment of the present invention.

DESCRIPTION OF EXEMPLARY EMBODIMENT

In the following detailed description, only certain exemplary embodiments of the present invention have been shown and described, simply by way of illustration. As those skilled in the art would realize, the described embodiments may be modified in various different ways, all without departing from the spirit or scope of the present invention. This invention may, however, be embodied in many different forms and should not be construed as being limited to the embodiments set forth herein; rather, these embodiments are provided so that this disclosure will be thorough and complete, and will fully convey the concept of the invention to those of ordinary skill in the art. Like reference numerals in the drawings denote like elements.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The term "and/or" includes any and all combinations of one or more of the associated listed items.

When it is described that an element is "coupled" or "connected" to another element, the element may be directly coupled or directly connected to the other element or may be a third element therebetween. On the contrary, when it is described that an element is "directly coupled" or "directly connected" to another element, it means no third element is therebetween.

The terminology used herein is for the purpose of describing particular embodiments only and is not intended to be limited by the exemplified embodiments. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

The preferred embodiments of the invention will now be described more fully with reference to the accompanying drawings. Like reference numerals in the drawings denote like elements, and thus their description will be omitted.

FIG. 1 is a block diagram of a security system using a laser range finder 110 according to an embodiment of the present invention.

Referring to FIG. 1, the security system using the laser range finder 110 comprises the laser range finder 110, a reflective means 120, an alarm means 130, and a storage unit 150.

The laser range finder 110 may be a laser range finder following a pulse detecting method of measuring a distance based on a time of flight of reflecting emitted laser beam on a target object and receiving the reflected laser beam, or a laser beam and range finder following various methods of emitting the laser beam modified by using a predetermined amplitude modulated or frequency modulated signal, comprising a phase or a frequency of a laser beam signal reflected by a target object, and measuring a distance.

Hereinafter, the laser range finder 110 of the present embodiment is a laser range finder using a phase detection method of measuring a distance based on a phase variation of emitted laser beam and received laser beam.

The laser range finder 110 emits a laser beam toward the reflective means 120, receives the laser beam reflected by the reflective means 120, and measures a distance between the laser range finder 110 and the reflective means 120. The laser range finder 110 compares the measured distance with a previously established distance and determines an existence of an intruder.

Although the laser range finder 110 that is well known art is not shown in detail, the laser range finder 110 may comprise a laser beam outputting unit 111, a laser beam receiving unit 113, and a controller 115.

The laser beam outputting unit 111 may comprise an electric circuit, a laser beam transmission laser diode, a laser beam transmission lens, etc. used to generate and modulate a signal, modulates the laser beam under the control of the controller 115, and emits the modulated laser beam toward the reflective means 120.

The laser beam receiving unit 113 may comprise a demodulation circuit, a laser beam receiving diode (for example, avalanche photo diode (APD), and a laser beam receiving lens, receives the laser beam reflected by the reflective means 120, demodulates the received laser beam, and provides the controller 115 with a demodulated electrical signal. The laser beam transmission and receiving lenses may be integrally formed.

The controller 115 controls the laser beam outputting unit 111, emits the laser beam toward the reflective means 120, and measures a distance between the controller 115 and the target object based on the electrical signal provided by the laser beam receiving unit 113.

Thereafter, the controller 115 determines that the intruder exists when the measured distance is not identical to the predetermined distance, provides the alarm means 130 with an alarm control signal, and stores intrusion information in the storage unit 150. When the controller 115 determines that the intruder exists, the controller 115 provides to a communication means the intrusion information and a communication control signal so that a predetermined institution or a manager can be notified of an intrusion using a predetermined communication method. The previously established distance is a distance between the laser range finder 110 and the reflective means 120. The intrusion information may include distance information between the intruder and the target object, i.e. location information and intrusion time of the intruder.

In more detail, when no intruder exists in a place where a security system is installed, since the laser beam emitted by the laser beam outputting unit 111 is reflected by the reflective means 120 and is received in the laser beam receiving unit 113, this means the measured distance is identical to the predetermined distance. When the intruder exists in the place where the security system is installed, since the laser beam emitted by the laser beam outputting unit 111 is reflected by the intruder and is received in the laser beam receiving unit 113, this means the measured distance is shorter than the predetermined distance. Therefore, the controller 115 compares the measured distance with the predetermined distance, thereby determining the existence of the intruder and measuring a distance between the laser range finder 110 and the intruder, i.e., locating the intruder.

The laser beam outputting unit 111, the laser beam receiving unit 113, and the controller 115 may be spaced apart from each other by a predetermined distance according to an environment of the security system.

The reflective means 120 reflects the laser beam emitted by the laser beam outputting unit 111 toward the laser beam receiving unit 113. The reflective means 120 may use a material having a high beam reflection rate, for example, such as a mirror. Also, the reflective means 120 is spaced by a predetermined error distance of the laser beam finder 110 from an original installation location in view of the error distance of the laser beam finder 110.

For example, when the reflective means 120 is installed 100 m away from the laser range finder 110, and the error distance of the laser beam finder 110 is 10 cm, the reflective means 120 is spaced by more than 10 cm (i.e., more than 100.1 m) from the original installation location in view of the error distance of the laser beam finder 110.

The reflective means 120 may not be separately installed. In more detail, since a general wall can reflect light, the reflective means 120 is not separately installed but the general wall can be used as the reflective means 120. However, material having a high beam reflection rate is used as the reflective means 12, which reduces a measurement error.

The alarm means 130 may comprise a bell, or an emergency light, outputs an alarm sound or operates the emergency light based on the alarm control signal provided by the controller 115.

The communication means 140 may comprise a wireless and/or wired network interface, receives the intrusion information from the controller 115, and transmits the intrusion information to the predetermined institution or the manager according to a predetermined communication protocol.

For example, the communication means 140 may transmit the intrusion information by means of a text message to a cellular phone having a predetermined number over a mobile communication network, or to a security company over a wireless, wired or a wireless/wired communication network in response to the communication control signal provided by the controller 115.

When the controller 115 determines that the intruder exists, the storage unit 150 stores the intrusion information provided by the controller 115. Also, the storage unit 150 may store a predetermined distance value, i.e., a distance value between the laser range finder 110 and the reflective means 120.

FIG. 2 is a block diagram of a security system using a laser range finder 110 according to another embodiment of the present invention. In the present embodiment, the security system using the laser range finder 110 is synchronized with a closed circuit television (CCTV).

Referring to FIG. 2, the security system using the laser range finder 110 may comprise the laser range finder 110, a reflective means 120, an alarm means 130, a communication means 140, a storage unit 150, a camera controller 160, and a monitoring camera 170. The laser range finder 110 may comprise a laser beam outputting unit 111, a laser beam receiving unit 113, and a controller 115.

The laser beam outputting unit 111, the laser beam receiving unit 113, the reflective means 120, the alarm means 130, and the communication means 140 have the same functions as described with reference to FIG. 1 and thus their descriptions are not repeated.

The controller 115 measures a distance between the laser range finder 110 and a target object based on an electrical signal provided by the laser beam receiving unit 113, compares the measured distance with a predetermined distance, and determines the existence of an intruder.

If the controller 115 determines that the intruder exists, the controller 115 provides the camera controller 160 with the measured distance, i.e., location information of the intruder.

The controller 115 may control the storage unit 150 to store an image of the intruder provided by the camera controller 160, and transmit the image of the intruder to a predetermined institution or a manager through the communication means 140.

The camera controller 160 controls the monitoring camera 170 based on the location information of the intruder provided by the controller 115 to photograph the image of the intruder and provide the controller 115 with the photographed image of the intruder.

For example, the camera controller 160 receives the location information of the intruder, i.e., a distance between the laser range finder 110 and the intruder, from the controller 115, and controls a photographing direction such as left and right and/or upper and lower angles of the monitoring camera 170 based on the location information of the intruder. The camera controller 160 calculates a distance between the monitoring camera 160 and the intruder based on the location information of the intruder provided by the controller 115, and zooms in or out the monitoring camera 170 based on the calculated distance, and adjusts a magnification and an image angle of the monitoring camera 160, thereby obtaining a clearer image of the intruder.

Thereafter, the camera controller 160 receives the photographed image of the intruder from the monitoring camera 170, encodes the received image of the intruder according to a previously established compression format, and provides the controller 115 with the encoded image of the intruder.

The monitoring camera 170 can be installed in a predetermined area of a place where the security system is installed, photographs the image of the intruder under the control of the camera controller 160, and provides the camera controller 160 with the photographed image of the intruder.

The monitoring camera 160 may move up and down and/or left and right in response to the control of the camera controller 160, and be designed to adjust an image angle.

As shown in FIG. 2, the security system using the laser range finder 110 of the present embodiment can determine the existence and location of the intruder, thereby monitoring the existence of the intruder by using a monitoring system such as the CCTV, and when an intrusion occurs, precisely photographing the existence and the image of the intruder, making it possible to positively handle the intrusion accordingly.

FIG. 3 is a view of an installation location of the reflective means 120 shown in FIGS. 1 and 2 according to an embodiment of the present invention. In the present embodiment, the reflective means 120 is spaced by a predetermined distance from the laser range finder 110 and is installed on a predetermined wall surface 121. For descriptive convenience, FIG. 3 shows only the laser range finder 110 and the reflective mean 120 of the security system using the laser range finder 110 shown in FIGS. 1 and 2.

Referring to FIG. 3, the reflective means 120 is spaced by an error distance b of the laser range finder 110 from the wall surface 121 that is the original installation location.

The laser range finder 110 may produce a measurement error due to a phase difference caused by the physical characteristics of a laser beam receiving diode (for example, MSM, PIN-PD, or APD), and a circuit factor such as beam noise, noise of a detector, noise of an amplifier, etc. The measurement error increases according to an increase in a distance between the laser range finder 110 and the reflective means 120. For example, if a distance between the laser range finder 110 and the wall surface 121 is 100 m, the measured error, i.e. the error distance may be substantially 10 cm. If the distance between the laser range finder 110 and the wall surface 121 is several kilometers, the error distance may be substantially several meters.

Therefore, in the present embodiment, in view of the error distance b of the laser range finder 110, the reflective means 120 is spaced from the laser range finder 110 by a distance of a+b obtained by summing the distance between the laser range finder 110 and the original installation location (i.e. the wall surface 121) and the error distance b, thereby precisely determining the existence and the location of the intruder when an object having thickness less than the error distance b or the intruder exists.

FIG. 4 is a view of an installation location of the reflective means 120 shown in FIGS. 1 and 2 according to another embodiment of the present invention.

Referring to FIG. 4, at least one reflective means 120 is installed in the form of a grid in locations (for example, the wall surface 121) that face each other, sequentially reflects the laser beam emitted by the laser beam outputting unit 111, and sends the reflected laser beam to the laser beam receiving unit 113, so that the security system can monitor an intruder in an area over a wide range by only using the laser beam receiving unit 113 and the laser beam outputting unit 111.

In more detail, the laser beam emitted by the laser beam outputting unit 111 is reflected by a first reflective means, the reflected laser beam is reflected by a second reflective means facing the first reflective means, and the laser beam reflected by the second reflective means is reflected by a third reflective means facing the second reflective means. Such process is repeated so that the laser beam reflected by at least one of the three reflective means is received in the laser beam receiving unit 113.

At least one reflective means 120 is installed at adjustable intervals, thereby adjusting the monitoring environment according to the size of an intrusion object. For example, at least one reflective means 120 is installed at a short interval, thereby monitoring an intrusion of a small object.

When at least one reflective means 120 is installed in the present embodiment, the laser beam receiving unit 113 and the laser beam outputting unit 111 may be spaced by a predetermined distance in accordance with the installation locations of at least one reflective means 120.

FIG. 5 is a view of an installation location of the reflective means shown in FIGS. 1 and 2 according to another embodiment of the present invention.

Referring to FIG. 5, at least one reflective means 120 may be installed in at least one of the rows 123 and 125 having different heights, and may be installed to have the same height in each of the rows 123 and 125.

When at least one reflective means 120 is installed on one of the rows 123 and 125 having different heights, the numbers of laser beam receiving unit 113 and the laser beam outputting unit 111 may correspond to the number of rows 123 and 125.

For example, when at least one reflective means 120 is installed in one of the two rows 123 and 125, the numbers of laser beam receiving unit 113 and the laser beam outputting unit 111 are each 2. The two laser beam outputting units 113 emit laser beam toward at least one reflective means 120 installed in one of the two rows 123 and 125, respectively. The two laser beam receiving units 113 receive the laser beam reflected by at least one reflective means 120 installed in one of the two rows 123 and 125, respectively, and transfer the received laser beam to the controller 115.

Even though at least one reflective means 120 is installed in at least one of the rows 123 and 125 having different heights, and are installed to have the same height in each of the rows 123 and 125 in the present embodiment, at least one reflective means 120 are can be installed in at least one of the rows having different heights, and one of the installed can have a long shape.

According to the security system using a laser range finder and method of detecting an intruder using the laser range finder, the laser range finder emits a laser beam, receives the laser beam reflected by a target object, measures a distance from the target object, compares the distance with a predetermined distance, and detects an existence and a location of the intruder. A reflective means reflects the laser beam emitted by the laser range finder to allow the laser range finder to receive the laser beam, and is spaced by a predetermined error distance of the laser range finder from an original installation location in view of the error distance.

Therefore, the reflective means is installed in view of the error distance of the laser range finder, thereby precisely determining the existence and the location of the intruder. Also, the location information of the intruder is used to control a monitoring camera, thereby exactly photographing an image of the intruder, and positively dealing with the intruder.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A security system using a laser range finder, the security system comprising:

the laser range finder configured to emit a laser beam, receive the reflected laser beam, measure a distance between the laser range finder and an intruder, compare the distance between the laser range finder and the intruder with a predetermined distance between at least one reflective means and the laser range finder, and detect an existence and a location of the intruder; and at least one reflective means configured to reflect the emitted laser beam toward the laser range finder, wherein at least one reflective means is disposed at the predetermined distance from the laser range finder, and wherein the predetermined distance includes or is in addition to a predetermined error distance of the laser range finder.

2. The security system of claim 1, wherein the laser range finder comprises:

a laser beam outputting unit configured to emit the laser beam toward at least one reflective means;

a laser beam receiving unit configured to receive the laser beam reflected by at least one reflective means and convert the received laser beam into an electrical signal; and a controller configured to measure the distance between the laser range finder and the intruder based on the electrical signal provided by the laser beam receiving unit, compare the distance between the laser range finder and the intruder to the predetermined distance, and if the distance between the laser range finder and the intruder is different from the predetermined distance, determine that the intruder exists and measure the location of the intruder based on the electrical signal provided by the laser beam receiving unit.

3. The security system of claim 2,
wherein the controller generates intrusion information and an alarm control signal when the controller determines that the intruder exists.

4. The security system of claim 3, further comprising:
a communication means comprising at least one of wired and wireless network interfaces, and configured to transmit the intrusion information under the control of the controller; and
an alarm means configured to perform at least one of an alarm sound output operation and an emergency light operation under the control of the controller.

5. The security system of claim 2, further comprising:
a monitoring camera photographing an image of the intruder; and
a camera controller configured to control the monitoring camera based on the location of the intruder, photograph the image of the intruder, and provide the controller with the photographed image of the intruder.

6. The security system of claim 5,
wherein the camera controller controls at least one of up/down/left/right angles, an image angle, and a magnification of the monitoring camera based on the location of the intruder.

7. The security system of claim 1,
wherein at least one reflective means includes a plurality of reflective means that is installed in the form of a grid, such that a first reflective means is oriented to receive the laser beam from the laser range finder and reflect the laser beam to a second reflective means configured to reflect the laser beam to any subsequent reflective means, and such that a final reflective means is oriented to reflect the laser beam to the laser range finder.

8. The security system of claim 1,
wherein at least one reflective means is installed in at least one of a plurality of rows having different heights.

9. The security system of claim 8,
wherein the plurality of rows comprises one or more reflective means at the same height.

10. A method of detecting an intruder using a laser range finder, the method comprising:
emitting a laser beam from the laser range finder;
reflecting the laser beam emitted by the laser range finder toward the laser range finder through at least one reflective means that is disposed at a predetermined distance from the laser range finder; and
detecting an existence and a location of the intruder by receiving the laser beam reflected by at least one reflective means and measuring a distance between the laser range finder and the intruder,
wherein the predetermined distance includes or is in addition to a predetermined error distance of the laser range finder.

11. The method of claim 10,
wherein detecting the existence and the location of the intruder, comprises:
generating intrusion information and an alarm control signal when it is determined that the intruder exists.

12. The method of claim 10,
wherein detecting the existence and the location of the intruder comprises:
transmitting intrusion information through at least one of wired and wireless network interfaces when it is determined that the intruder exists.

13. The method of claim 10, further comprising:
when it is determined that the intruder exists, controlling a monitoring camera based on the location of the intruder; and
photographing an image of the intruder by using the monitoring camera.

* * * * *